(12) United States Patent
Arabackyj et al.

(10) Patent No.: US 10,020,769 B2
(45) Date of Patent: Jul. 10, 2018

(54) APPARATUS FOR ACTUATING AND/OR MONITORING A BRUSHLESS DC MOTOR

(71) Applicant: CONTI TEMIC MICROELECTRONIC GMBH, Nuremberg (DE)

(72) Inventors: Marc Arabackyj, Nuremberg (DE); Thomas Guertler, Nuremberg (DE); Thomas Huemmrich, Marktrodach (DE); Mathias Kuhn, Eckental (DE); Robert Istvan Loerincz, Timisoara (RO); Andreas Pschorr, Regensburg (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 0 days.

(21) Appl. No.: 15/316,255

(22) PCT Filed: May 27, 2015

(86) PCT No.: PCT/EP2015/061729
§ 371 (c)(1),
(2) Date: Dec. 5, 2016

(87) PCT Pub. No.: WO2015/185417
PCT Pub. Date: Dec. 10, 2015

(65) Prior Publication Data
US 2017/0155352 A1    Jun. 1, 2017

(30) Foreign Application Priority Data
Jun. 4, 2014 (DE) .......................... 10 2014 210 653

(51) Int. Cl.
*H02P 29/024* (2016.01)
*H02P 6/16* (2016.01)
(Continued)

(52) U.S. Cl.
CPC .............. *H02P 29/024* (2013.01); *H02P 6/16* (2013.01); *H02P 27/06* (2013.01); *G07C 5/0808* (2013.01)

(58) Field of Classification Search
CPC .. H02P 27/06; H02P 6/085; H02P 6/12; H02P 6/16; H02P 6/28; H02P 29/024; G07C 5/0808
See application file for complete search history.

(56) References Cited

U.S. PATENT DOCUMENTS

| | | | |
|---|---|---|---|
| 3,810,577 A | 5/1974 | Drescher et al. | |
| 4,654,566 A * | 3/1987 | Erdman | F23N 3/082 318/400.01 |

(Continued)

FOREIGN PATENT DOCUMENTS

| | | |
|---|---|---|
| AT | 507540 A1 | 5/2010 |
| DE | 202009018791 U1 | 7/2013 |

(Continued)

OTHER PUBLICATIONS

Robert Istvan Lorince et al. "Harware Implementation of BLDC Motor Diagnosis", Recent Researches in Circuits, Systems and Signal Processing, Jul. 14, 2011, pp. 202-207.

*Primary Examiner* — Bentsu Ro
*Assistant Examiner* — Thai Dinh
(74) *Attorney, Agent, or Firm* — Laurence A. Greenberg; Werner H. Stemer; Ralph E. Locher

(57) ABSTRACT

A device for actuating and/or monitoring a brushless DC motor, preferably for safety-relevant applications, preferably while operating or controlling a vehicle or components of a vehicle and a method for reliably checking the functional capability of the device are provided. The device can be actuated by a motor control unit by using a control signal for actuating and/or monitoring a brushless direct current motor by using a converter circuit includes a switching-off appa- (Continued)

ratus, a driver circuit which acts on the converter circuit and a testable diagnosis unit for monitoring the device and/or the converter circuit and/or the brushless direct current motor. The switching-off apparatus acts on the driver circuit. The testable diagnosis unit can be tested for a malfunction by using a testing command transmitted by the motor control unit.

10 Claims, 4 Drawing Sheets

(51) Int. Cl.
  *H02P 27/06* (2006.01)
  *G07C 5/08* (2006.01)

(56) References Cited

U.S. PATENT DOCUMENTS

| | | | |
|---|---|---|---|
| 5,446,354 A * | 8/1995 | Hiruma | G01R 31/34 318/400.09 |
| 5,923,135 A * | 7/1999 | Takeda | B60L 11/1803 318/432 |
| 6,794,839 B1 * | 9/2004 | Maslov | H02P 27/06 310/216.001 |
| 7,673,949 B2 * | 3/2010 | Kuramochi | B60T 8/885 303/122.03 |
| 8,362,764 B2 | 1/2013 | Peukert et al. | |
| 8,947,028 B2 * | 2/2015 | Gu | H02P 21/0096 318/400.02 |
| 9,254,863 B2 | 2/2016 | Kuwahara et al. | |
| 9,654,048 B2 * | 5/2017 | West | H02P 29/024 |
| 9,762,050 B2 * | 9/2017 | Uryu | H02H 7/1222 |
| 2010/0024457 A1 * | 2/2010 | Adachi | B60H 1/00428 62/230 |
| 2010/0052581 A1 * | 3/2010 | Izumi | B60K 6/48 318/400.04 |
| 2014/0060496 A1 | 3/2014 | Ham et al. | |
| 2014/0379204 A1 | 12/2014 | Goto et al. | |
| 2015/0002062 A1 * | 1/2015 | Kim | H02P 6/16 318/400.07 |
| 2015/0137718 A1 * | 5/2015 | Liu | G01R 23/00 318/400.03 |
| 2015/0185293 A1 | 7/2015 | Milano et al. | |
| 2015/0239494 A1 | 8/2015 | Fukunaga et al. | |

FOREIGN PATENT DOCUMENTS

| | | |
|---|---|---|
| DE | 102012113084 A1 | 3/2014 |
| EP | 2559985 A1 | 2/2013 |
| JP | S4861041 A | 8/1973 |
| JP | 2002099321 A | 4/2002 |
| JP | 2010197093 A | 9/2010 |
| JP | 2012210150 A | 10/2012 |
| JP | 2013140065 A | 7/2013 |
| WO | 2009121352 A2 | 10/2009 |
| WO | 2012176357 A1 | 12/2012 |
| WO | 2014057671 A1 | 4/2014 |
| WO | 2015100214 A2 | 7/2015 |

\* cited by examiner

APPARATUS FOR ACTUATING AND/OR MONITORING A BRUSHLESS DC MOTOR

BACKGROUND OF THE INVENTION

Field of the Invention

The invention relates to an apparatus for actuating and/or for monitoring a brushless DC motor, preferably for safety-relevant applications, for example based on the IEC 61508 or ISO 26262 standard, preferably when operating or controlling a vehicle or components of a vehicle. The invention further relates to a method for reliably checking the operability of such an apparatus.

In brushless DC motors, a continuously or incrementally rotating magnetic field is produced by phase-shifted actuation of stator coils by means of a converter circuit. By way of example, of three stator coils in a six-step actuation system known from the prior art, two stator coils always carry current, while a third stator coil, which changes from step to step, remains current less. Such a six-step actuation system can be produced by means of a converter circuit that is known as a B6 bridge from the prior art. Such a B6 bridge comprises three pairs of electronically controlled switching elements, for example field effect transistors (FETs), connected in parallel between a supply voltage. Each of the parallel-connected pairs of switching elements comprises two series-connected switching elements that are opened alternately, with a stator coil supply voltage being tapped off from the connection between each of the two series-connected switching elements and supplying power to a respective stator coil.

BRIEF SUMMARY OF THE INVENTION

The invention is based on the object of specifying an apparatus for actuating electronic switching elements of a converter circuit that is used to reliably recognize faulty or malfunctioning actuation of the brushless DC motor. The invention is further based on the object of specifying a method for actuating electronic switching elements of a converter circuit that is used to reliably recognize faulty or malfunctioning actuation of the brushless DC motor in safety-relevant applications, for example based on the IEC 61508 or ISO 26262 standard.

In respect of the apparatus, the object is achieved by the features described below. In respect of the method, the object is achieved by the steps described below.

Advantageous embodiments of the invention are the subject matter of the sub claims.

The apparatus according to the invention for actuating and/or monitoring a converter circuit for actuating a brushless DC motor for safety-relevant applications comprises
 a switching-off apparatus,
 a driver circuit and
 a testable diagnosis unit.

The apparatus is actuated by means of a control signal from a motor control unit. The control signal may be in bidirectional form, so that information can be sent from the motor controller to the apparatus and/or information can be sent from the apparatus to the motor control unit. By way of example, the motor control unit can use the control signal to prescribe the direction of rotation and speed of rotation of the brushless DC motor. It is also possible for signals from position transmitters that describe the position and/or the state of motion of the brushless DC motor to be transmitted to the motor control unit.

An external switching-off signal incoming on a switching-off signal input line is transmitted to the switching-off apparatus. The switching-off apparatus acts on the driver circuit and, given an incoming external switching-off signal, puts this driver circuit, and, by means of the driver circuit, also the brushless DC motor, into a safe state. A safe state is achieved, depending on the application, by a braked or by a free-running rotor of the brushless DC motor, for example.

The driver circuit is connectable to the converter circuit and the testable diagnosis unit. The driver circuit actuates switching elements of the converter circuit such that a speed of rotation and direction of rotation of the brushless DC motor, as prescribed by means of the control signal from the motor control unit, are obtained.

The testable diagnosis unit monitors parameters of components of the apparatus and/or parameters of the converter circuit and/or parameters of the brushless DC motor. By comparing a monitored parameter with the operate value of at least one limit value, a failure of the apparatus and/or of the converter circuit and/or of the brushless DC motor is recognized as a positive fault state.

A test command sent from the motor control unit to the testable diagnosis unit is used to ascertain a fault state and transmit it to the motor control unit, said fault state describing the operability, particularly a malfunction, of the testable diagnosis unit.

In one embodiment of the invention, the apparatus according to the invention comprises a reliable communication unit that is couple able to the testable diagnosis unit. Using the reliable communication unit, the testable diagnosis unit transmits values of monitored parameters of the brushless DC motor and/or a fault state to the motor control unit, which, given a positive fault state, generates an external switching-off signal. The reliable communication unit can also be used to transmit a test command for testing the testable diagnosis unit and/or a fault status of the testable diagnosis unit, as ascertained in response to such a test command.

By way of example, the reliable communication unit may be in the form of a communication unit that is used to divide successive bits of a binary signal into data packets, wherein sent data packets are augmented by a checksum and wherein, given received data packets, a checksum is tested. Advantageously, the checksum can be used to recognize an erroneously transmitted bit value in a data packet. A person skilled in the art is familiar with methods for generating and testing checksums by means of which even multiple bit errors in a data packet are recognizable and/or corrigible.

The reliable communication unit may alternatively or additionally provide sent data packets with a packet identification and/or check a packet identification of received data packets. By way of example, it is possible to provide sent data packets with a progressively incremented variable first integer that, in order to limit it to a finite range of values, is subjected to a modulo operation with a fixed second integer, for example the value 256. Similarly, it is possible to verify the packet identification of a received data packet. If the transmitted packet identification differs from the actually received packet identification, then this means that an erroneously repeated packet transmission or the loss of a data packet is recognizable, for example. A person skilled in the art is familiar with further methods for generating and checking packet identifications. Advantageously, it is thus possible to check the integrity of data transmitted by means of the reliable communication unit, such as measured values of parameters monitored by means of the testable diagnosis unit or a fault status generated by the testable diagnosis unit, for example. Hence, the probability of a faulty and/or unsafe state of the brushless DC motor not being transmitted to the motor control unit is substantially decreased in comparison with the apparatuses known from the prior art for transmitting a control signal, and hence safety integrity is substantially improved.

The operability of the testable diagnosis unit can be tested by means of a test command sent by the motor control unit via the control signal. If a test on the operability of the testable diagnosis unit fails, then the reliable communication unit is used to transmit a positive fault state to the motor control unit. This positive fault state likewise results in the generation of an external switching-off signal by the motor control unit.

Advantageously, the apparatus according to the invention attains safer operation of a brushless DC motor through the use of a testable diagnosis unit. By way of example, it is possible to attain operation in accordance with the requirements of a safety integrity such as ASIL-A, ASIL-B, ASIL-C or ASIL-D, as described in the ISO 26262-3 Automotive Safety Integrity Level (ASIL) standard, even if the components of the apparatus and/or the converter circuit and/or the brushless DC motor would not independently meet the requirements of such a safety integrity. Advantageously, a safe and nevertheless cost-saving implementation of actuation for a brushless DC motor is therefore possible.

In one embodiment of the invention, the testable diagnosis unit monitors the switching state of the converter circuit. Hence, the testable diagnosis unit recognizes failed switching elements in the converter circuit. In this embodiment of the invention, it is advantageously also possible to use technologies for producing switching elements that, although inexpensive, do not independently meet the requirements on a desired safety integrity. By way of example, it is possible to use FETs as switching elements in the converter circuit.

In one embodiment of the invention, the testable diagnosis unit monitors the operability of at least one position transmitter by means of which the angle of rotation and/or the speed of rotation of a rotor of the brushless DC motor is determinable. In one embodiment of the invention, the at least one position transmitter is in the form of a Hall sensor. Hall sensors are inexpensive to produce, easily integrable and are well suited to recognizing a magnetic field and hence to recognizing the position of a permanently magnetic rotor in a brushless DC motor.

In one embodiment of the invention, the testable diagnosis unit monitors the temperature of at least one component of the apparatus. A failure of a component, for example a switching element, or a short often results in an undesirably large flow of current and hence in heating of the surroundings of a failed component beyond a normal, envisaged operating temperature. In this embodiment of the invention, such failures can be recognized early on. Further, it is advantageously possible to recognize whether safe operation of the apparatus continues to be possible. As such, it is possible to avoid a failure or unsafe operation of the brushless DC motor as a result of infringement of the specification limits for the operating temperatures of components, for example brought about by an excessively high ambient temperature or by a failure of a cooling apparatus.

In one embodiment of the invention, the testable diagnosis unit monitors at least one supply voltage and/or at least one output voltage of the converter circuit. Advantageously, this embodiment makes it possible to avoid a failure or unsafe operation of the brushless DC motor as a result of infringement of specification limits for the supply voltages of components, for example brought about by the failure of a voltage transformer.

A method for checking a testable diagnosis unit in an apparatus for actuating a brushless DC motor comprises
  in a first method step, the execution of a test command transmitted from the motor control unit to the testable diagnosis unit, comprising the adjustment of a test value for at least one limit value, corresponding to a monitored parameter,
  in a subsequent second processing step, the transmission of a fault state from the testable diagnosis unit to the motor control unit, wherein a positive fault state value denotes the exceeding of at least one limit value of a monitored parameter,
  in a subsequent first decision step, the recognition of a malfunction of the testable diagnosis unit given a non positive fault state value,
  in a third processing step, the resetting of the fault state to a non positive fault state value and the resetting of the at least one limit value of a monitored parameter to an operate value,
  in a subsequent fourth processing step, the transmission of the fault state from the testable diagnosis unit to the motor control unit,
  in a subsequent third decision step, the recognition of a malfunction of the testable diagnosis unit given a positive fault state value, and
  in a subsequent fifth processing step, the setting of a successful test state.

The first method step of the method according to the invention prompts a state that is recognizable as a positive fault state by an operable testable diagnosis unit. In the first decision step, a check is performed to determine whether the testable diagnosis unit has actually recognized a positive fault state of this kind. If this recognition of a positive fault state fails to materialize, then the operability of the testable diagnosis unit is not ensured. In the event of such a failure of the testable diagnosis unit, an external switching-off signal and/or parameters transmitted by the motor control unit via the control signal can be used to bring about a safe state, for example shutdown, of the brushless DC motor. Particularly through regular repetition of the method according to the invention for checking the testable diagnosis unit, this improves the safety integrity during the operation of the brushless DC motor substantially in comparison with diagnosis units based on the prior art, so that parallel monitoring—known from the prior art—of a testable diagnosis unit of this kind becomes unnecessary. It is further possible to use for the testable diagnosis unit itself, but also for further components connected to the testable diagnosis unit for performance of their monitoring function, for example temperature or voltage sensors, production technologies that do not independently meet the necessary prerequisites for a desired reliability level. The method according to the invention therefore also allows simpler and less expensive actuation systems that satisfy the desired reliability level to be produced for brushless DC motors than are known based on the prior art.

In one embodiment, the method according to the invention comprises, in a second decision step that follows the first decision step, the recognition of a malfunction of the testable diagnosis unit, if the interval of time between the transmission of the test command in the first method step and the transmission of a positive fault state from the testable diagnosis unit to the motor control unit in the second method step is outside a predetermined range of intervals of time. Advantageously, this embodiment of the invention allows a positive fault state that has not been ascertained as a consequence of the transmitted test command to be recognized.

By way of example, it is possible for a testable diagnosis unit with failed temperature monitoring to respond to a test command that lowers the upper limit value of a monitored temperature to a value below the normal operating temperature by initially not transmitting a positive fault status. In some situations, the monitoring of another parameter, for example a supply voltage, can continue to operate. In that case, an actually occurring overvoltage or under voltage can be taken as a basis for randomly generating a positive fault status that is wrongly deemed to be the expected response to the test command for checking the testable diagnosis unit. The limiting, according to the invention, of the interval of time from the transmission time of the test command, within which a transmitted positive fault status is regarded as corresponding to the test command and hence is evidence of operability of the testable diagnosis unit, substantially reduces the probability of a testable diagnosis unit wrongly diagnosed as operable. Hence, this embodiment of the invention improves the safety integrity of the apparatus.

In one embodiment, the method according to the invention comprises at least one repetition of the first method step and of all subsequent method and decision steps. Advantageously, this allows a testable diagnosis unit to be tested regularly, for example at predetermined intervals of time. The effect that can be achieved by this is that a failure of the testable diagnosis unit, and hence potentially a failure or malfunction of the brushless DC motor, is recognized no later than after a predetermined time. This allows particularly safe continuous operation of a brushless DC motor.

BRIEF DESCRIPTION OF THE SEVERAL VIEWS OF THE DRAWING

Further details and exemplary embodiments of the invention are explained in more detail below with reference to drawings, in which.

DESCRIPTION OF THE INVENTION

Figure 1:
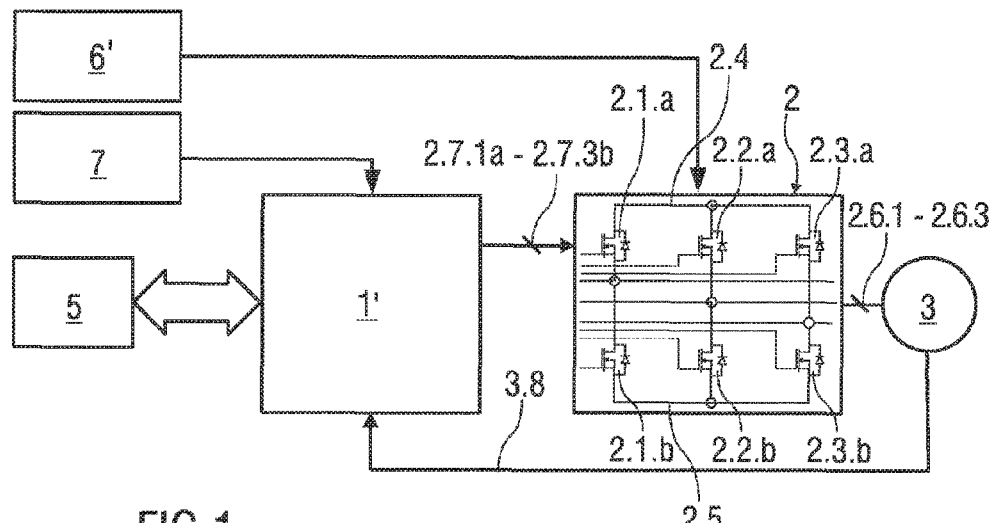
FIG. 1 schematically shows the design of an apparatus for actuating a converter circuit based on the prior art, FIG. 2 schematically shows the flow of control for monitoring a converter circuit based on the prior art, FIG. 3 schematically shows the design of an apparatus according to the invention for actuating a converter circuit, FIG. 4 schematically shows the flow of control for monitoring an apparatus according to the invention for actuating a converter circuit, and FIG. 5 and FIG. 6 schematically show the sequence of the method according to the invention for monitoring the actuation of a converter circuit.

FIG. 1 schematically shows a converter circuit 2 for a brushless DC motor 3 having three stator coils—not shown in more detail—that is actuated by an actuating apparatus 1' based on the prior art.

The converter circuit 2 comprises three positive-side field effect transistors (FETs) 2.1.a, 2.2.a, 2.3.a and three negative-side FETs 2.1.b, 2.2.b, 2.3.b, which are connected in the manner of a B6 bridge, one positive-side FET 2.1.a, 2.2.a, 2.3.a and one negative-side FET 2.1.b, 2.2.b, 2.3.b being connected in series between a positive supply voltage line 2.4 and a negative supply voltage line 2.5 in each case. Connected at the junction between a positive-side FET 2.1.a, 2.2.a, 2.3.a and a negative-side FET 2.1.b, 2.2.b, 2.3.b is a respective coil supply line 2.6.1 to 2.6.3 that supplies current to a respective stator coil of the brushless DC motor 3.

The FETs 2.1.a to 2.3.b of the converter circuit 2 are controlled by the actuating apparatus 1' based on the prior art such that a respective one of the three coil supply lines 2.6.1 to 2.6.3 is alternately current less. The order and the speed of the alteration of the current less coil supply line 2.6.1 to 2.6.3 control the direction of rotation and the speed of rotation of the magnetic field that is built up in the brushless DC motor 3 by means of the stator coils.

To this end, the actuating apparatus 1' based on the prior art provides six control voltages for actuating the FETs 2.1.a to 2.3.b, which are transmitted on six actuating lines 2.7.1a to 2.7.3b. The chronology of these six control voltages is determined by a control signal 4, shown in FIG. 2, that a motor control unit 5 uses to communicate with the actuating apparatus 1' based on the prior art. By way of example, such a control signal 4 can comprise an interface known from the prior art as a serial peripheral interface (SPI) that is used to supply data and/or commands to the actuating apparatus 1' based on the prior art. Such a control signal 4 may further comprise a pulse width modulated signal that is transmitted in parallel to such an SPI interface and that entails a series of pulses controlling the chronology of the six control voltages for actuating the FETs 2.1.a to 2.3.b.

The chronology of these six control voltages is further determined by a rotor status signal that is transmitted via a rotor status line 3.8 from the brushless DC motor 3 to the actuating apparatus 1' based on the prior art and that describes the position and/or the speed of rotation of the rotor.

If one or more FET(s) 2.1.a to 2.3.b fail(s), it is possible for the converter 2 to actuate the brushless DC motor 3 incorrectly or even destroy it. For this reason, in arrangements known from the prior art, the converter 2 is monitored by means of a diagnosis unit 6' based on the prior art.

In order to ensure safe switching-off of the brushless DC motor 3, for example even in the case of a disturbance in the control signal 4 or in the interface used for this control signal 4, a switching-off apparatus 7 for generating a switching-off signal is connected to the actuating apparatus 1' based on the prior art. When a switching-off signal is applied to the actuating apparatus 1' based on the prior art, the latter is put into a safe state and generates control voltages for the FETs 2.1.a to 2.3.b such that the converter circuit 2 and the brushless DC motor 3 are likewise put into a safe state.

Figure 2:
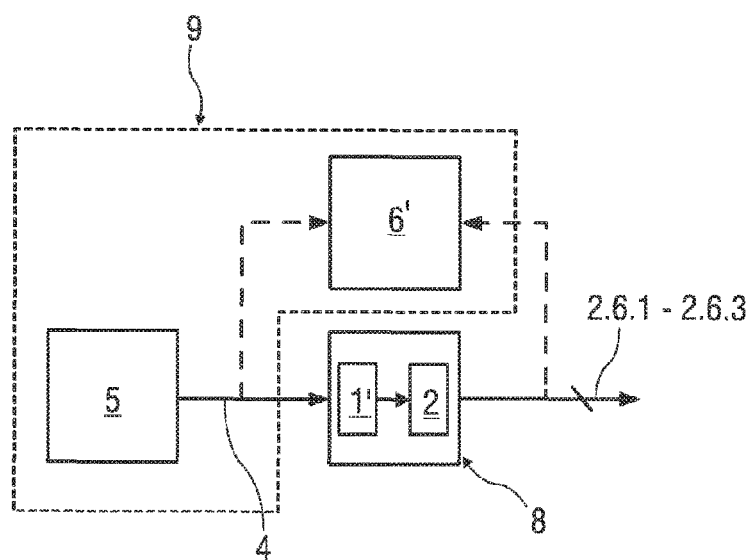

FIG. 2 schematically shows the flow of control for monitoring, known from the prior art, the actuation of a brushless DC motor 3. Along an unsecured control path 8, comprising the actuating apparatus 1' based on the prior art and the converter circuit 2, voltages for supplying current to the stator coils are generated that are transmitted via the coil supply lines 2.6.1 to 2.6.3 to the brushless DC motor 3. Parallel to the unsecured control path 8, along a secured control path 9, comprising the motor control unit 5 and the diagnosis unit 6' based on the prior art, a check is performed to determine whether the actual actuation of the brushless DC motor 3 matches the actuation required by the motor control unit 5 via the control signal 4.

Figure 3:
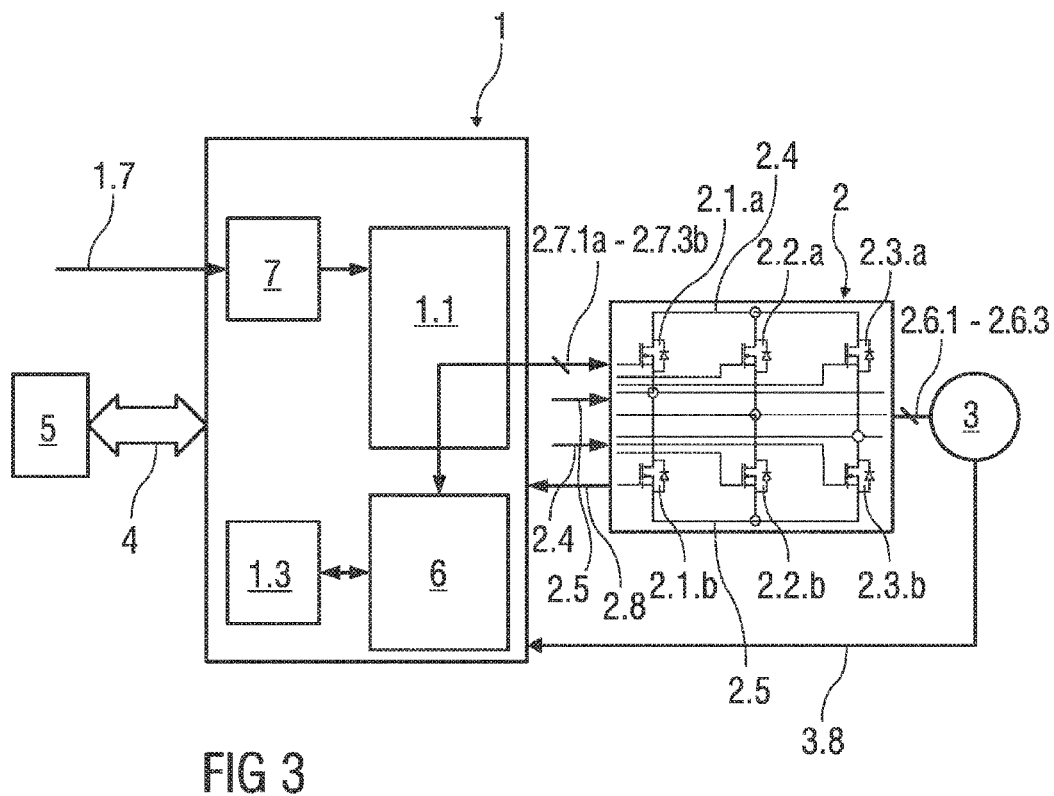

FIG. 3 schematically shows the design of an apparatus 1 according to the invention for actuating and/or monitoring a converter circuit 2 for actuating a brushless DC motor 3. The apparatus 1 comprises a driver circuit 1.1 for producing control voltages that actuate the FETs 2.1.a to 2.3.b of the converter circuit 2 by means of actuating lines 2.7.1a to

2.7.3b. The apparatus 1 further comprises a testable diagnosis unit 6, a reliable communication unit 1.3 and a switching-off apparatus 7.

The apparatus 1 communicates with the motor control unit 5 by means of a control signal 4. The motor control unit 5 may be in the form of a microcontroller, for example. The control signal 4 can be transmitted to the apparatus 1 by means of an SPI interface, for example. It is possible for a control signal 4 to be transmitted bi directionally, with at least one first element of a control signal 4 being sent by the motor control unit 5 and at least one second element of a control signal 4 being sent by the apparatus 1. The apparatus 1 is further provided for the reception of an external switching-off signal by means of a switching-off signal input line 1.7.

The apparatus 1 receives from the converter circuit 2, via a converter status line 2.8, a converter status signal that describes parameter values of the converter circuit 2, such as a supply and/or control voltage and/or a temperature, for example.

It is possible for the apparatus 1 to receive from the brushless DC motor 3, by means of a rotor status line 3.8, a rotor status signal that describes the position of the rotor of the brushless DC motor 3 by means of parameter values for at least one position transmitter. A person skilled in the art is familiar, from the prior art, with apparatuses and methods for obtaining such a rotor status signal, for example by means of Hall sensors integrated in the stator, by means of photoelectric position transmitters or by means of inductive position transmitters.

The basic workings of the apparatus 1 are described below.

From the control signal 4, control voltages for actuating the FETs 2.1.a to 2.3.b of the converter circuit 2 are produced continuously in the driver circuit 1.1.

At the same time, the testable diagnosis unit 6 compares continuously ascertained values of at least one monitored parameter against at least one predetermined operate value, corresponding to this parameter, of a limit value in order to check the correct operation of the apparatus 1 and/or of the converter circuit 2 and/or of the brushless DC motor 3. By way of example, the testable diagnosis unit 6 checks whether a predetermined maximum temperature for a measurement point of the driver circuit 1.1 is exceeded and/or whether a predetermined admissible voltage range for a supply voltage of the driver circuit 1.1 is infringed.

The occurrence and, optionally, the type and scope of a disturbance are transmitted to the motor control unit 5 by the testable diagnosis unit 6 as a positive fault status by means of the reliable communication unit 1.3. On the occurrence of a positive fault status, the motor control unit 5 can initiate generation of a switching-off signal that is routed to the apparatus 1 via the switching-off signal input line 1.7.

Subsequently, the switching-off apparatus 7 is activated, which apparatus puts the driver circuit 1.1 and also, by means of the control voltages transmitted to the converter circuit 2 by the driver circuit 1.1 for the purpose of actuating the FETs 2.1.a to 2.3.b, equally the converter circuit 2 into a safe state.

A safe state of this kind can be achieved by using the converter circuit 2 to brake the rotor of the brushless DC motor 3, for example. In another embodiment of the invention, a safe state can be achieved by putting the rotor of the brushless DC motor 3 into a certain predetermined position or moving it at a certain predetermined speed of rotation. It is also possible to achieve a safe state by disconnecting all coil supply lines 2.6.1 to 2.6.3.

It is also possible that when a positive fault status exists, the motor control unit 5 generates not only the switching-off signal but also a control signal 4 that actuates the converter circuit 2 such that the brushless DC motor is put into a safe state. By way of example, it is possible to use a control signal 4 to put the converter circuit 2 into a high impedance state by turning off the FETs 2.1.a to 2.3.b. Advantageously, this allows the brushless DC motor 3 to be put into a safe state even if generation, transmission or processing of the switching-off signal should be disturbed.

Figure 4:
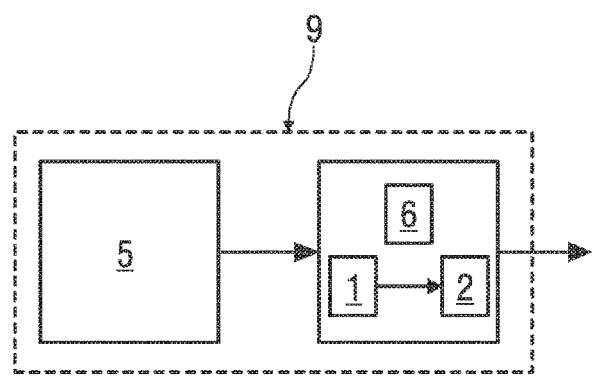

According to the invention, the driver circuit 1.1, the testable diagnosis unit 6, the reliable communication unit 1.3 and the switching-off apparatus 7 are arranged in a secure control path 9 in this case, as shown in FIG. 4. By way of example, the driver circuit 1.1, the testable diagnosis unit 6, the reliable communication unit 1.3 and the switching-off apparatus 7 may be in a form such that they meet the requirements of certain classification schemes for functional safety. Thus, it is possible to produce the driver circuit 1.1, the testable diagnosis unit 6, the reliable communication unit 1.3 and the switching-off apparatus 7 in accordance with the requirements of a safety integrity such as ASIL-A, ASIL-B, ASIL-C or ASIL-D, as described in the ISO 26262-3 Automotive Safety Integrity Level (ASIL) standard. Advantageously, the additional monitoring along a further control path based on the prior art is dispensed with.

It is possible to attain such a desired safety integrity by providing components having a particularly low failure rate. By way of example, for the switching-off apparatus 7 and for the transmission of a switching-off signal to the driver circuit 1.1 and the converter circuit 2, it is possible to use components for which a failure rate of no more than one failure per ten million hours, corresponding to a value of 0.1 failure in time (FI), is specified.

Another way of attaining a desired safety integrity is monitoring the operability of components of the apparatus 1 by means of the testable diagnosis unit 6. If a check on the operability of at least one component of the apparatus 1 fails, then a positive fault state is transmitted to the motor control unit 5 via the control signal 4, the control signal 4 being transmitted to the motor control unit 5 via a secure connection. A person skilled in the art is familiar with methods and arrangements for setting up a secure connection of this kind for transmitting the control signal 4. By way of example, when transmitting an at least partially binary-encoded control signal 4, it is possible to combine successive bit values into data packets. Such a data packet may be provided with a test value that is ascertained and tested using a method known to a person skilled in the art as cyclic redundancy check (CRC), for example. This allows detection of a fault during the transmission of the bit values of the data packet with which the CRC test value is associated.

It is further possible to provide a data packet, in addition or as an alternative to a test value, with a packet identification, which may be in the form of a continuously incremented input counter for received data packets and in the form of a continuously incremented output counter for sent data packets, for example. Such a packet identification can be used to recognize repeatedly sent data packets or the loss of a data packet.

When a positive fault state of the apparatus 1 is recognized by means of the motor control unit 5, the switching-off apparatus 7 is used to adopt a safe state. In other words: the apparatus 1 is put into a safe state if the operability for at least one of the components monitored by the testable diagnosis unit 6 is not faultless. Advantageously, it is therefore possible to provide an apparatus 1 with a high level of reliability even when individual components of the apparatus 1, for example on account of an excessively high failure rate, would not individually conform to a desired safety integrity.

In one embodiment of the invention, the testable diagnosis unit 6 monitors the state of the driver circuit 1.1 by measuring at least one of the control voltages generated by the driver circuit 1.1 for the FETs 2.1.*a* to 2.3.*b* and comparing it with at least one corresponding limit value that is derived from the control signal 4 by the motor control unit 5. By way of example, it is possible to compare each control voltage against an upper and a lower limit value.

In one embodiment of the invention, the testable diagnosis unit 6 monitors the state of the converter circuit 2 by measuring the output voltages on the coil supply lines 2.6.1 to 2.6.3 and comparing them in the same or a similar manner with limit values that are derived from the control signal 4.

In one embodiment of the invention, the testable diagnosis unit 6 measures at least one supply voltage for supplying power to the apparatus 1, to the driver circuit 1.1 or to further components of the apparatus 1 and/or a supply voltage for supplying power to the converter circuit 2 and/or a supply voltage for supplying power to the brushless DC motor 3 and compares a measured supply voltage in the same or a similar manner with a corresponding limit value such as a control voltage.

It is further possible to use the testable diagnosis unit 6 to capture temperature values, for example the temperature of a chip on which at least one component of the apparatus 1 is arranged and/or the temperature of a chip on which at least one component of the converter circuit 2 is arranged, and to compare them in the same or a similar manner with corresponding limit values such as control voltages. In one variant embodiment, it is also possible to compare a temperature value only against a corresponding upper limit value.

A limit value for comparison with a corresponding measured value, for example for a supply voltage or a temperature, can be stored on a memory unit of the testable diagnosis unit 6, which is not shown in more detail. Alternatively, it is also possible to transmit such a limit value from the motor control unit 5 to the apparatus 1 by means of the control signal 4.

Figure 5:
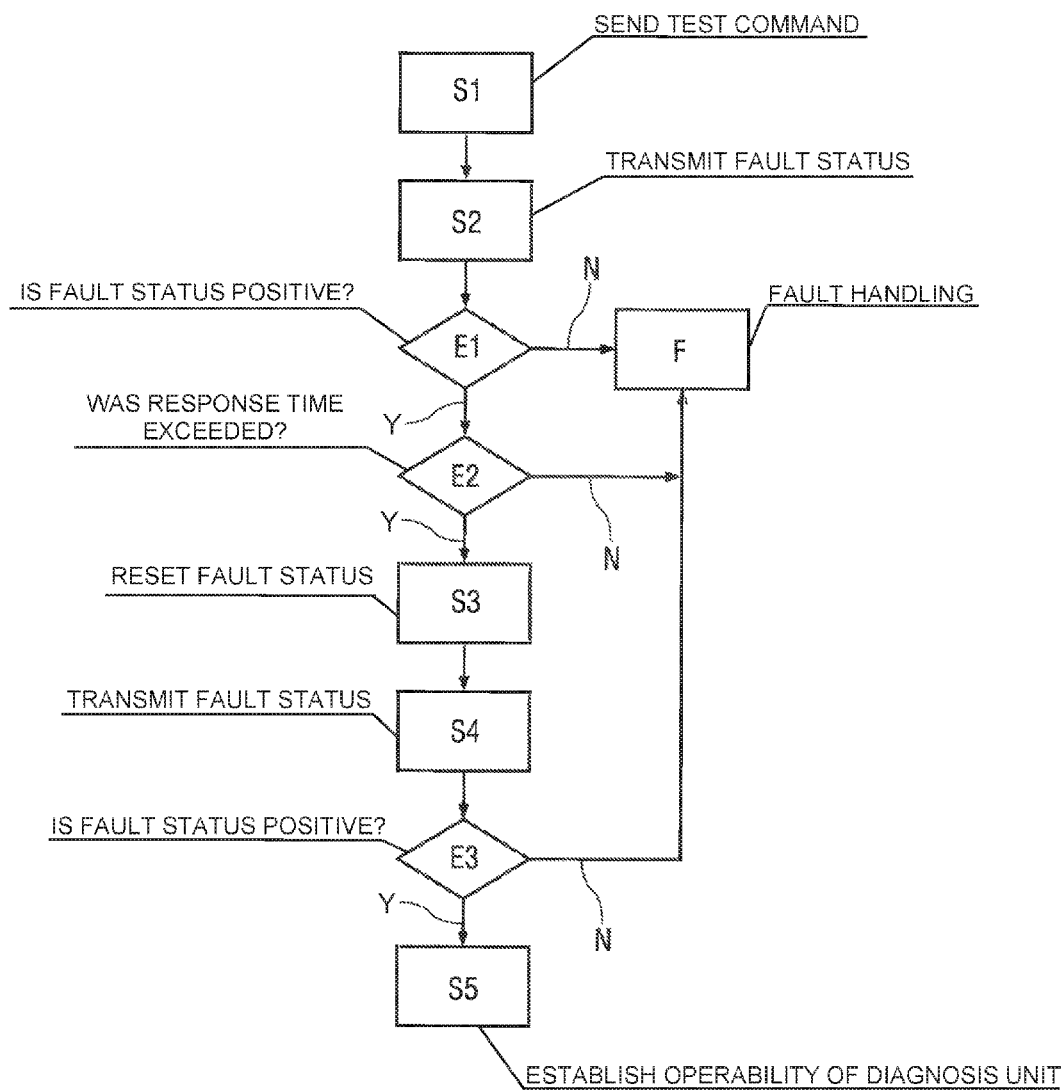

FIG. 5 schematically shows the sequence of a method according to the invention for monitoring the testable diagnosis unit 6 that monitors the operability of components of the apparatus 1 by measuring at least one monitored parameter and comparing it with the operate value of at least one corresponding limit value.

In a first method step S1, a control signal 4 is used to send a test command for starting a function check to the testable diagnosis unit 6, which test command prompts alteration of at least one limit value for at least one parameter monitored by the testable diagnosis unit 6. In this case, a limit value is altered from an operate value to a test value. In contrast to an operate value, such a test value of a limit value is used not for monitoring the operability of a component of the apparatus 1 but rather for monitoring the operability of the testable diagnosis unit 6.

In this case, a lower limit value is increased sufficiently for the corresponding monitored parameter to be safely below the increased test value for this lower limit value in a normal operating state. An upper limit value is decreased sufficiently for the corresponding monitored parameter to safely exceed this decreased test value for the upper limit value in a normal operating state.

By way of example, an upper limit value can be decreased from an operate value of 170° C. for a temperature of a component of the apparatus 1 to a test value of −50° C. if the temperature to be expected during normal, undisturbed operation is 120° C. in this case.

As a further example, a lower limit value can be increased from an operate value of 3 V for a supply voltage to a test value of 6 V if the supply voltage to be expected during normal, undisturbed operation is 3.3 V.

The at least one limit value altered by means of the test command prompts a positive fault status to be set in the testable diagnosis unit 6 during normal, undisturbed operation.

In a subsequent second method step S2, the fault status of the testable diagnosis unit 6 is transmitted to the motor control unit 5. Such a fault status is negative if none of the parameters monitored for exceeding a limit value has exceeded a corresponding upper limit value, and none of the parameters monitored for being below a limit value has been below a corresponding lower limit value, since the initialization or since the last reset of the fault status. In all other cases, the fault status is positive, that is to say indicates a malfunction in at least one monitored component.

In this case, it is possible for this fault status to be requested, that is to say polled, by the motor control unit 5 once or repeatedly at largely regular intervals by means of a request command. Alternatively, it is possible for this fault status to be sent from the apparatus 1 to the motor control unit 5 without a request command from the motor control unit 5.

In a subsequent first decision step E1, a check is performed to determine whether the fault status is positive, in other words: whether the testable diagnosis unit 6 has, as expected, recognized the exceeding of a limit value for at least one monitored parameter.

In this situation, that is to say after a test command is sent, a negative fault status indicates a failure of the testable diagnosis unit 6. In the event of a negative fault status of this kind, there ensues along a negative decision path N a fault handling step F in which a switching-off signal on the switching-off signal input line 1.7 is used to activate the switching-off apparatus 7 and, as a result, and/or as a result of a control signal 4, the apparatus 1, the converter circuit 2 and the brushless DC motor 3 are put into a safe state.

In the event of a positive fault status, the testable diagnosis unit 6 has successfully recognized the exceeding of a limit value for at least one parameter, as prompted by means of the test command. The first decision step E1 is then followed along a positive decision path Y by a second decision step E2, in which a check is performed to determine whether this recognition of the exceeding of a limit value occurred within a predetermined response time interval after the test command was sent. Exceeding of this predetermined response time interval suggests a breakdown in the testable diagnosis unit 6. By way of example, it is possible for the recorded positive fault status not to be the result of the execution of the test command, but rather to have been prompted by another instance of a limit value being exceeded, as ascertained correctly or erroneously by the testable diagnosis unit. Therefore, if the predetermined response time interval has not been observed, the fault handling step F ensues along a negative decision path N, said fault handling step involving the apparatus 1, the converter circuit 2 and the brushless DC motor 3 being put into a safe state in the manner described.

If it is ascertained in the second decision step E2 that the positive fault status was recorded within the predetermined response time interval after the test command was sent, then the second decision step E2 is followed along a positive decision path Y by a third processing step S3, in which the fault status is reset, that is to say set to a negative fault status. In this third processing step S3, the at least one limit value altered to a test value in the first processing step S1 is further reset to the corresponding operate value.

In a subsequent fourth processing step S4, the fault status of the testable diagnosis unit 6 is transmitted to the motor control unit 5 again. In this case, it is possible for this fault status to be requested, that is to say polled, by the motor control unit 5 once or repeatedly at largely regular intervals by means of a request command. Alternatively, it is possible for this fault status to be sent from the apparatus 1 to the motor control unit 5 without a request command from the motor control unit 5.

In a subsequent third decision step E3, a check is performed to determine whether the fault status is positive, in other words: whether the testable diagnosis unit 6 has recognized an instance of the operate value of at least one limit value for a monitored parameter being exceeded.

In the event of a positive fault status, the third decision step E3 is followed along a positive decision path Y by a fault handling step F in which an external switching-off signal on the switching-off signal input line 1.7 is used to activate the switching-off apparatus 7, and the apparatus 1, the converter circuit 2 and the brushless DC motor 3 are put into a safe state.

In the event of a negative fault status, the third decision step E3 is followed by a fifth processing step S5, in which the operability of the testable diagnosis unit 6 is established. It is possible that in this fifth processing step S5, the operability of the testable diagnosis unit 6 is stored in the manner of a test state, optionally provided with a time stamp.

The effect achieved by the method shown in FIG. 5 is that a malfunction in the testable diagnosis unit 6 is recognized and that, in the event of such a malfunction, a fault handling step F is performed that puts the apparatus 1, the converter circuit 2 and the brushless DC motor 3 into a safe state. It is therefore possible for components such as the converter circuit 2, for example, that independently do not satisfy the necessary prerequisites for a desired reliability level to be used, by means of monitoring by the testable diagnosis unit 6, in an arrangement for actuating a brushless DC motor 3 that does meet the desired reliability level.

In one embodiment of the invention, it is possible for the fifth processing step S5 to be followed by a fresh sequence of the method, beginning with the method step S1, being started. In this case, it is possible to delay the start of the fresh sequence by a predetermined period of time. Advantageously, the effect achieved by this is that the operability of the testable diagnosis unit 6 is checked regularly and at sufficiently short intervals of time.

Further, embodiments of the invention are possible in which a test command is used in the first processing step S1 to prompt alteration of at least one limit value for precisely one parameter monitored by the testable diagnosis unit 6. In such an embodiment of the invention, the operability of the testable diagnosis unit 6 is testable in detail for a monitored parameter. It is therefore advantageously possible to ascertain additional information in the event of a failure of the testable diagnosis unit 6.

However, embodiments of the invention are also possible in which a test command is used in the first processing step S1 to prompt alteration of at least one limit value for more than one parameter monitored by the testable diagnosis unit 6. By way of example, it is possible in this case to alter the at least one limit value for all parameters monitored by the testable diagnosis unit 6. In such an embodiment of the invention, the operability of the testable diagnosis unit 6 can be monitored summarily with a minimum number of test commands. This allows a very frequent check on the testable diagnosis unit 6, and hence a short delay on reaching a safe state for the brushless DC motor 3 after a failure of the testable diagnosis unit 6.

Figure 6:
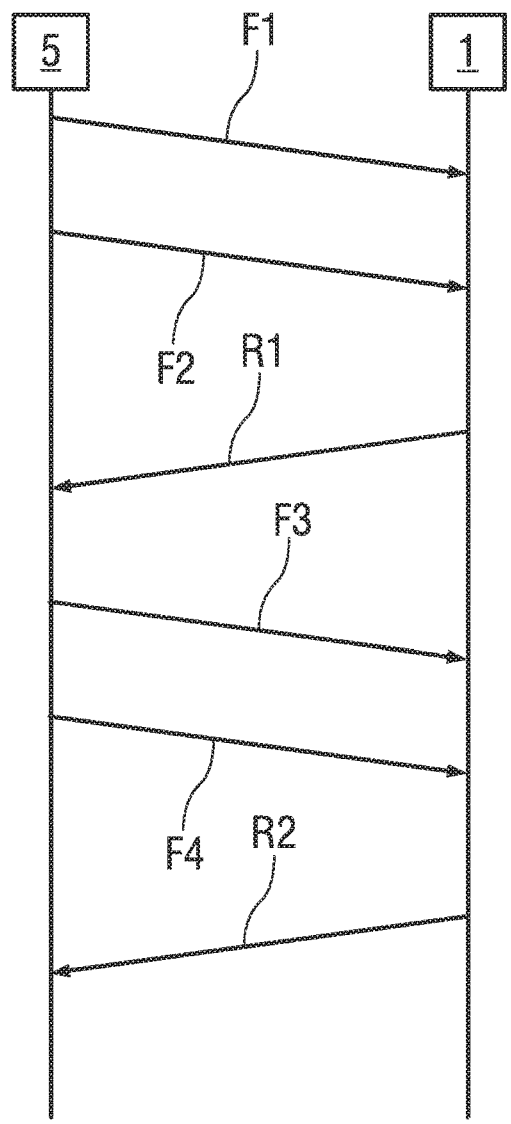

FIG. 6 schematically shows a sequence diagram for the communication between a motor control unit 5 and an apparatus 1.

Along a first function call F1, a test command for starting a function check is sent from the motor control unit 5 to the apparatus 1, said test command being forwarded to the testable diagnosis unit 6 within the apparatus 1. This first function call F1 initiates the first method step S1.

Along a second function call F2, the apparatus 1 is asked to return the fault state. This second function call F2 is forwarded to the testable diagnosis unit 6 within the apparatus 1 and initiates the second method step S2.

Along a first value return R1, the fault state of the testable diagnosis unit 6 is transmitted from the apparatus 1 to the motor control unit 5 following execution of the second method step S2.

Along a third function call F3, the fault state of the testable diagnosis unit 6 is reset. This third function call F3 initiates the third processing step S3.

Along a fourth function call F4, the apparatus 1 is asked to return the fault state. This fourth function call F4 is forwarded to the testable diagnosis unit 6 within the apparatus 1 and initiates the fourth processing step S4.

Along a second value return R2, the fault state of the testable diagnosis unit 6 is transmitted from the apparatus 1 to the motor control unit 5 following execution of the fourth method step S4.

The invention claimed is:

1. An apparatus for at least one of actuating or monitoring a brushless DC motor by using a converter circuit, the apparatus comprising:
   a driver circuit acting on the converter circuit;
   a switching-off apparatus acting on said driver circuit; and
   a testable diagnosis unit configured for monitoring at least one parameter of at least one component selected from the group consisting of the switching-off apparatus and the brushless DC motor;
   said testable diagnosis unit being configured to respond to a test command by ascertaining and outputting a fault state describing a malfunction of said testable diagnosis unit.

2. The apparatus according to claim 1, which further comprises:
   a motor control unit; and
   a reliable communication unit to be coupled to said testable diagnosis unit, said reliable communication unit transmitting the test command and the fault state of said testable diagnosis unit as ascertained in response to the test command to said motor control unit.

3. The apparatus according to claim 1, wherein said testable diagnosis unit is configured to monitor a switching state of said converter circuit.

4. The apparatus according to claim 1, which further comprises at least one position transmitter for ascertaining a position of a rotor of the brushless DC motor, said testable diagnosis unit monitoring an operability of said at least one position transmitter.

5. The apparatus according to claim 4, wherein said at least one position transmitter is a Hall sensor.

6. The apparatus according to claim 1, wherein said testable diagnosis unit is configured to monitor a temperature of at least one of said converter circuit or at least one component of the apparatus.

7. The apparatus according to claim 1, wherein said testable diagnosis unit monitors at least one of at least one supply voltage or at least one output voltage of said converter circuit.

8. A method for monitoring a testable diagnosis unit in an apparatus for at least one of actuating or monitoring a brushless DC motor by using a converter circuit, the apparatus including a driver circuit, a switching-off apparatus acting on the driver circuit, and the testable diagnosis unit, the method comprising the following steps:
  executing a test command transmitted from a motor control unit to the testable diagnosis unit, including an adjustment of a test value for at least one limit value, corresponding to a monitored parameter, in a first processing step;
  transmitting a fault state from the testable diagnosis unit to the motor control unit in a subsequent second processing step, with a positive fault state value denoting exceeding of at least one limit value of a monitored parameter;
  recognizing a malfunction of the testable diagnosis unit given a non-positive fault state value in a subsequent first decision step;
  resetting the fault state to a non-positive fault state value and resetting the at least one limit value for the at least one monitored parameter to an operate value in a third processing step;
  transmitting the fault state from the testable diagnosis unit to the motor control unit in a subsequent fourth processing step;
  recognizing a malfunction of the testable diagnosis unit given a positive fault state value in a subsequent third decision step; and
  setting a successful test state in a subsequent fifth processing step.

9. The method according to claim 8, which further comprises using the testable diagnosis unit to monitor an operability of at least one position transmitter for ascertaining a position of a rotor of a brushless DC motor, recognizing a malfunction of the testable diagnosis unit in a second decision step following the first decision step, if an interval of time between the transmission of the test command and the transmission of a positive fault state from the testable diagnosis unit to the motor control unit in the second processing step is outside a predetermined range of intervals of time.

10. The method according to claim 8, which further comprises repeating the first method step and all subsequent steps at least once.

* * * * *